Jan. 9, 1923.

W. A. HALIBURTON.
DRIVING BOX FOR LOCOMOTIVES.
FILED AUG. 19, 1919.

Inventor
W. A. Haliburton,
By
Attorney

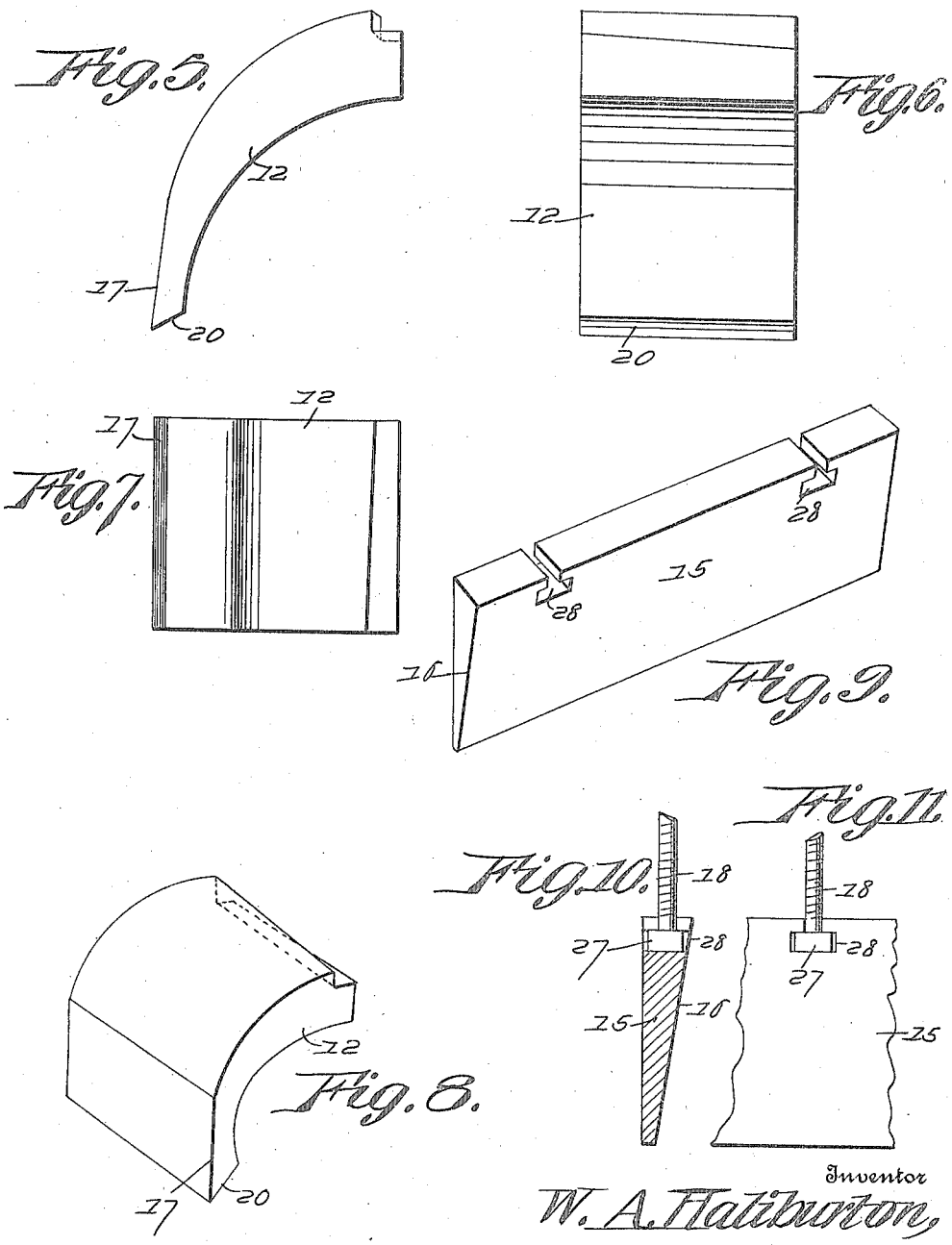

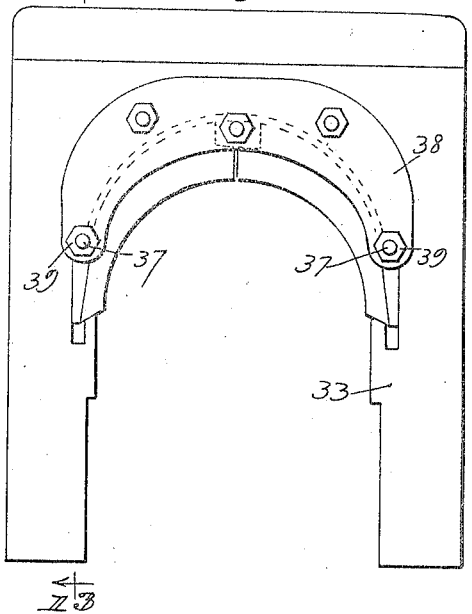
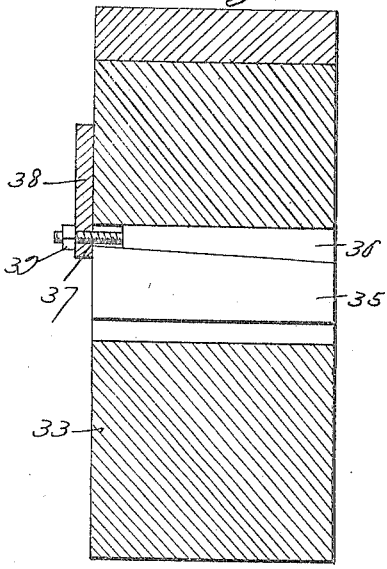
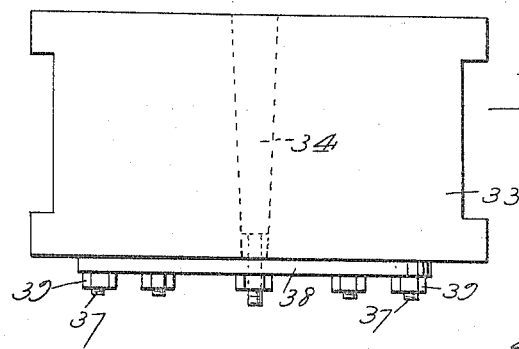
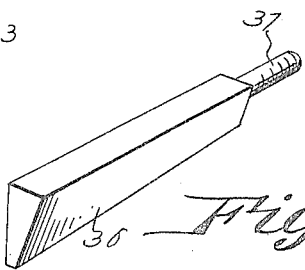
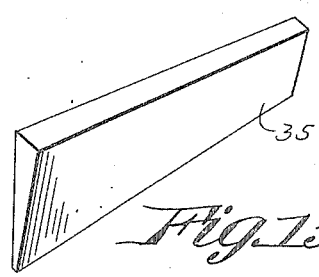

Patented Jan. 9, 1923.

1,441,925

UNITED STATES PATENT OFFICE.

WILLIAM A. HALIBURTON, OF CONNELLYS SPRINGS, NORTH CAROLINA.

DRIVING BOX FOR LOCOMOTIVES.

Application filed August 19, 1919. Serial No. 318,462.

*To all whom it may concern:*

Be it known that WILLIAM A. HALIBURTON, a citizen of the United States of America, residing at Connellys Springs, in the county of Burke and State of North Carolina, has invented new and useful Improvements in Driving Boxes for Locomotives, of which the following is a specification.

The object of the invention is to provide means for compensating for wear and taking up lost motion in the bearings of locomotive drive wheel axles and those used in connection with other forms of vehicles and machinery, particularly where brasses are employed, and under such conditions as to adapt the structure to be applied to the bearing when the vehicle or machine is built or after the use of the same has involved a considerable wear necessitating repair or renewal.

A further object of the invention is to provide a device for the purpose indicated which is capable of adjustment from time to time as the wear on the parts proceeds without necessitating the dismounting of the axles or the dropping of the wheels as is necessary in connection with the means heretofore used for a similar purpose.

With these and analogous objects in view the invention consists in a construction, combination and relation of parts of which preferred embodiments are illustrated in the accompanying drawings, it being understood that changes in form, proportions and details may be resorted to within the scope of the appended claim without departing from the principles involved.

In the drawings:

Figure 1 is a face view of a journal bearing adapted for car wheel axles, the same being constructed in accordance with the invention.

Figure 2 is a plan view of the bearing box.

Figures 3 and 4 are respectively side and plan views of the brass spreading wedge.

Figure 5 is a detail view of one of the brasses or brass members.

Figures 6 and 7 are respectively side and plan views of one of the brass members.

Figure 8 is a perspective view of the same.

Figure 9 is a perspective view of one of the side or brass contracting wedges.

Figures 10 and 11 are respectively sectional and partial side views of the wedge shown in Figure 9.

Figure 12 is a face view of a slightly modified form of bearing box and brass adjusting attachment illustrating a construction which is common with relatively small bearings.

Figure 13 is a sectional view taken on the plane indicated by the line 13—13 of Figure 12.

Figure 14 is a plan view of the bearing illustrated in Figure 12.

Figures 15 and 16 are perspective views respectively of the side or brass contracting wedges such as are employed preferably in connection with the construction of bearing illustrated in Figure 12.

The bearing block or box 10 in the form of the device as illustrated in Figures 1 to 11 inclusive, is of the ordinary construction as far as exterior form or outline is concerned, the seat 11 for the brass represented by the members 12 and 13 being modified only to the extent of providing lateral recesses 14 for the reception wedges 15 herein referred to as side or brass contracting wedges and being tapered toward their lower edges with bevelled inner surfaces 16 co-acting with bevelled side surfaces 17 of the brass members so that by forcing the side wedges downward by means of the threaded stems or bolts 18, the brass may be contracted or the members thereof may be moved toward each other to contract the bearing surfaces represented by the inner sides of the brass members. At the lower ends of the recess 14 there are formed pockets or extensions 19 for the reception of the lower reduced edges of the side wedges to thus permit of a sufficiently extensive adjustment of the wedges to effect the desired object. At their lower extremities the brass members are outwardly and downwardly bevelled as shown at 20 to rest upon similarly inclined ledges 21 adjacent to the extensions or pockets 19, so that the tendency of the brass members is to move or settle outward or from each other by reason of the jarring of the structure, rather than to move inwardly or in the opposite direction and thus involve an excessive amount of friction upon the surface of the axle or other journal which may be mounted therein.

Between the upper extremities of the brass members there is interposed the brass spreading or expanding wedge 22 having its stem 23 extended through an opening in a plate 24 bolted or otherwise secured as at 25 to the face of the bearing block or box, and obviously by loosening the nut 26 with which the stem 23 is fitted the brass members may be permitted to move inward by the downward adjustment of the side wedges 15.

The bolts 18 by which the movements of the side wedges are controlled are preferably headed as at 27 to fit in T-shaped seats 28 formed in the wedges 15 near their upper edges, said headed ends of the bolts being insertible laterally into the seats and constituting a swivel connection between the bolts and wedges, the former being threaded to engage threaded openings formed in the bearing box or block so that by turning the bolts for which purpose the upper ends thereof are provided with wrench seats 30, the side wedges may be adjusted to secure a sufficiently snug fit of the brass members to the axle or journal mounted therein. The upper edge of the bearing box or block is hollowed out as indicated at 31 to form a grease well through which the bolts 18 extend, and fitted upon the bolts and in contact with the floor of this well are jam nuts 32 which serve to lock the bolts and therefore the side wedges in adjusted positions.

It will be observed that the adjustment of a bearing to take up lost motion or compensate for wear may be accomplished entirely from the outside of the bearing merely by loosening the wedge 22 and forcing the side wedges downwardly by turning the bolts 30 after loosening the jam nuts.

With certain of the smaller types of bearing boxes or blocks 33 as indicated in the form of the device shown in Figures 12 and 16 inclusive, it is impossible or impractical to employ the upright bolts for securing the desired adjustment of the side wedges which are used to contract the brass and therefore there is employed as indicated in the drawings, in addition to the interposed or spreading wedge 34, a sectional side or contracting wedge consisting of the brass engaging element 35 and the operating element 36, both of which are wedge-shaped and with the latter provided with a stem 37 extending through the bracket or face plate 38 and fitted with an adjusting nut 39. After the loosening of the spreading wedge 34 the nuts 39 controlling the positions of the operating wedge elements 36 may be adjusted to secure the downward movement of the brass contracting elements 35 and thus accomplish the same purpose as indicated with reference to the form of the invention illustrated in Figures 1 to 11 inclusive.

What is claimed is:

The combination of a bearing box having its brass receiving seat provided with lateral recesses, a divided brass having its members arranged in said seat and provided with downwardly and outwardly bevelled side surfaces terminating in outwardly bevelled bearing ends, bearing ledges being provided at the sides of the box for the reception of said bevelled extremities of the brass members, a brass spreading wedge interposed between the upper ends of the brass members, means for adjusting said spreading wedge, side or brass contracting wedges disposed in said recesses in engagement with the side bevelled surfaces of the brass members, and means for adjusting said side wedges, the recess in which said side wedges are mounted being downwardly extended below said bearing ledges to form pockets for the reception of the reduced edges of the side wedges.

In testimony whereof he affixes his signature.

WILLIAM A. HALIBURTON.